United States Patent
Helitzer et al.

(10) Patent No.: US 7,610,210 B2
(45) Date of Patent: Oct. 27, 2009

(54) SYSTEM FOR THE ACQUISITION OF TECHNOLOGY RISK MITIGATION INFORMATION ASSOCIATED WITH INSURANCE

(75) Inventors: Jonathon Helitzer, Simsbury, CT (US); G. Stewart Murchie, Hartford, CT (US); Kelly L. Frey, Farmington, CT (US); Casey Ellen Kempton, Rocky Hill, CT (US); Joseph R. Carvalko, Jr., Milford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 1099 days.

(21) Appl. No.: 10/655,804

(22) Filed: Sep. 4, 2003

(65) Prior Publication Data

US 2005/0055248 A1     Mar. 10, 2005

(51) Int. Cl.
*G06Q 40/00* (2006.01)
*G06Q 30/00* (2006.01)

(52) U.S. Cl. .............................. 705/4; 705/1
(58) Field of Classification Search ...... 705/4
See application file for complete search history.

(56) References Cited

U.S. PATENT DOCUMENTS

| | | | |
|---|---|---|---|
| 4,667,336 A | 5/1987 | Best | |
| 5,635,693 A | 6/1997 | Benson et al. | |
| 5,797,134 A * | 8/1998 | McMillan et al. | 705/400 |
| 5,825,283 A | 10/1998 | Camhi | |
| 5,873,066 A | 2/1999 | Underwood et al. | |
| 5,950,150 A | 9/1999 | Lloyd et al. | |
| 5,970,464 A | 10/1999 | Apte et al. | |
| 6,064,970 A | 5/2000 | McMillan et al. | |
| 6,067,488 A | 5/2000 | Tano | |
| 6,078,857 A | 6/2000 | Jung et al. | |

(Continued)

FOREIGN PATENT DOCUMENTS

EP     0155779     9/1985

(Continued)

OTHER PUBLICATIONS

Riegel, Insurance principle and practices, 1921, Prentice-Hall, Inc, p. i-xi.*

(Continued)

*Primary Examiner*—C. Luke Gilligan
*Assistant Examiner*—Tran Nguyen
(74) *Attorney, Agent, or Firm*—Ropes & Gray LLP

(57) ABSTRACT

The invention herein generally pertains to underwriting an insurance policy utilizing sensors to detect, determine, measure and assess one or more conditions, states of affairs, physical properties and process as each relates an insurable property interest. More specifically is disclosed a method and computerized system for managing the underwriting, quoting and binding an insurance policy with regard to the technology used to militate against the financial consequences of certain property losses. The significance of operable safety related devices or system loads are important diagnostic safety markers for measuring one or more properties affecting the safety or risk aversion and for underwriting an insurable interest. This invention also relates to a system and a method for acquiring and assessing the qualities, variables and parameters that affect the underwriting premium for a building structure (commercial or residential), vehicle, aircraft, marine craft or cargo.

21 Claims, 8 Drawing Sheets

U.S. PATENT DOCUMENTS

| | | |
|---|---|---|
| 6,112,225 A | 8/2000 | Kraft et al. |
| 6,154,658 A | 11/2000 | Caci |
| 6,163,277 A | 12/2000 | Gehlot |
| 6,182,048 B1 | 1/2001 | Osborn et al. |
| 6,204,757 B1 | 3/2001 | Evans et al. |
| 6,211,777 B1 | 4/2001 | Greenwood et al. |
| 6,223,125 B1 | 4/2001 | Hall |
| 6,246,934 B1 | 6/2001 | Otake et al. |
| 6,307,965 B1 | 10/2001 | Aggarwal et al. |
| 6,389,340 B1 | 5/2002 | Rayner |
| 6,502,020 B2 | 12/2002 | Lang |
| 6,563,423 B2 | 5/2003 | Smith |
| 6,583,734 B2 | 6/2003 | Bates et al. |
| 6,594,579 B1 | 7/2003 | Lowrey et al. |
| 6,611,740 B2 | 8/2003 | Lowrey et al. |
| 6,633,820 B2 | 10/2003 | Bizar |
| 6,636,790 B1 | 10/2003 | Lightner et al. |
| 6,643,578 B2 | 11/2003 | Levine |
| 6,684,189 B1 | 1/2004 | Ryan et al. |
| 6,710,738 B2 | 3/2004 | Allen, Jr. |
| 6,732,031 B1 | 5/2004 | Lightner et al. |
| 6,735,525 B1 | 5/2004 | Murphy |
| 6,754,485 B1 | 6/2004 | Obradovich et al. |
| 6,756,915 B2 | 6/2004 | Choi |
| 6,767,330 B2 | 7/2004 | Lavery et al. |
| 6,768,417 B2 | 7/2004 | Kuragaki et al. |
| 6,795,759 B2 | 9/2004 | Doyle |
| 6,823,258 B2 | 11/2004 | Ukai et al. |
| 6,832,141 B2 | 12/2004 | Skeen et al. |
| 6,839,305 B2 | 1/2005 | Perlman et al. |
| 6,853,956 B2 | 2/2005 | Ballard, Jr. et al. |
| 6,868,339 B2 | 3/2005 | Murphy et al. |
| 6,868,386 B1 | 3/2005 | Henderson et al. |
| 6,871,199 B1 | 3/2005 | Binnig et al. |
| 6,920,379 B2 | 7/2005 | Miyamoto |
| 6,925,425 B2 | 8/2005 | Remboski et al. |
| 6,931,309 B2 | 8/2005 | Phelan et al. |
| 6,957,133 B1 | 10/2005 | Hunt et al. |
| 6,965,326 B2 | 11/2005 | Allison |
| 6,968,453 B2 | 11/2005 | Doyle et al. |
| 6,973,319 B2 | 12/2005 | Ormson |
| 6,977,612 B1 | 12/2005 | Bennett |
| 6,985,922 B1 | 1/2006 | Bashen et al. |
| 6,987,964 B2 | 1/2006 | Obradovich et al. |
| 7,017,142 B1 | 3/2006 | Ehnebuske et al. |
| 7,069,118 B2 | 6/2006 | Coletrane et al. |
| 7,114,376 B2 | 10/2006 | Loucks et al. |
| 2001/0039509 A1 | 11/2001 | Dar et al. |
| 2001/0042024 A1 | 11/2001 | Rogers |
| 2001/0044733 A1 | 11/2001 | Lee et al. |
| 2002/0002475 A1 | 1/2002 | Freedman et al. |
| 2002/0010601 A1 | 1/2002 | Taylor |
| 2002/0013717 A1 | 1/2002 | Ando et al. |
| 2002/0052765 A1 | 5/2002 | Taylor |
| 2002/0055861 A1 | 5/2002 | King et al. |
| 2002/0087364 A1 | 7/2002 | Lerner et al. |
| 2002/0091550 A1 | 7/2002 | White et al. |
| 2002/0103622 A1 | 8/2002 | Burge |
| 2002/0111725 A1 | 8/2002 | Burge |
| 2002/0115423 A1 | 8/2002 | Hatae et al. |
| 2002/0116228 A1* | 8/2002 | Bauer et al. ............ 705/4 |
| 2002/0128882 A1 | 9/2002 | Nakagawa et al. |
| 2002/0173885 A1 | 11/2002 | Lowrey et al. |
| 2002/0178033 A1 | 11/2002 | Yoshioka et al. |
| 2002/0194033 A1 | 12/2002 | Huff |
| 2003/0033057 A1 | 2/2003 | Kallestad |
| 2003/0040934 A1 | 2/2003 | Skidmore et al. |
| 2003/0093366 A1 | 5/2003 | Halper et al. |
| 2003/0135395 A1 | 7/2003 | Carfi et al. |
| 2003/0139948 A1 | 7/2003 | Strech |
| 2003/0154009 A1 | 8/2003 | Basir et al. |
| 2003/0158758 A1 | 8/2003 | Kanazawa |
| 2003/0171956 A1 | 9/2003 | Cox et al. |
| 2003/0187704 A1 | 10/2003 | Hashiguchi et al. |
| 2003/0221118 A1 | 11/2003 | Walker |
| 2003/0229522 A1 | 12/2003 | Thompson et al. |
| 2003/0233261 A1 | 12/2003 | Kawahara et al. |
| 2003/0233278 A1 | 12/2003 | Marshall |
| 2003/0233323 A1 | 12/2003 | Bilski et al. |
| 2004/0036601 A1 | 2/2004 | Obradovich |
| 2004/0039611 A1 | 2/2004 | Hong et al. |
| 2004/0117217 A1 | 6/2004 | Reber et al. |
| 2004/0139034 A1 | 7/2004 | Farmer |
| 2004/0148201 A1 | 7/2004 | Smith et al. |
| 2004/0153362 A1 | 8/2004 | Bauer et al. |
| 2004/0153762 A1 | 8/2004 | Flynn et al. |
| 2004/0181495 A1 | 9/2004 | Grush et al. |
| 2004/0215494 A1 | 10/2004 | Wahlbin et al. |
| 2004/0220837 A1 | 11/2004 | Bonissone et al. |
| 2004/0225535 A1 | 11/2004 | Bond et al. |
| 2004/0243450 A1 | 12/2004 | Bernard et al. |
| 2004/0249557 A1 | 12/2004 | Harrington et al. |
| 2004/0249679 A1 | 12/2004 | Henderson et al. |
| 2004/0260579 A1 | 12/2004 | Tremiti |
| 2004/0267577 A1 | 12/2004 | Nakai |
| 2005/0021360 A1 | 1/2005 | Miller et al. |
| 2005/0038682 A1 | 2/2005 | Gandee et al. |
| 2005/0055248 A1 | 3/2005 | Helitzer et al. |
| 2005/0055249 A1 | 3/2005 | Helitzer et al. |
| 2005/0065682 A1 | 3/2005 | Kapadia et al. |
| 2005/0070299 A1 | 3/2005 | Caspi et al. |
| 2005/0071202 A1 | 3/2005 | Kendrick |
| 2005/0075067 A1 | 4/2005 | Lawson et al. |
| 2005/0086084 A1 | 4/2005 | Dillard |
| 2005/0091175 A9 | 4/2005 | Farmer |
| 2005/0102172 A1 | 5/2005 | Sirmans, Jr. |
| 2005/0108065 A1 | 5/2005 | Dorfstatter |
| 2005/0174217 A1 | 8/2005 | Basir et al. |
| 2005/0192730 A1 | 9/2005 | Churchill et al. |
| 2005/0216583 A1 | 9/2005 | Cole et al. |
| 2005/0278082 A1 | 12/2005 | Weekes |
| 2005/0285748 A1 | 12/2005 | Pedraza et al. |
| 2006/0000420 A1 | 1/2006 | Martin Davies |
| 2006/0009289 A1 | 1/2006 | McCarten et al. |
| 2006/0033625 A1 | 2/2006 | Johnson et al. |
| 2006/0036473 A1 | 2/2006 | Taylor |
| 2006/0053038 A1 | 3/2006 | Warren et al. |

FOREIGN PATENT DOCUMENTS

| | | |
|---|---|---|
| EP | 1 145 163 | 10/2001 |
| EP | 1160707 | 12/2001 |
| EP | 1241599 | 9/2002 |
| EP | 1313043 | 5/2003 |
| EP | 1544771 | 6/2005 |
| EP | 1583013 | 10/2005 |
| JP | 2001118175 | 4/2001 |
| JP | 20031319051 | 11/2001 |
| JP | 2002092764 | 3/2002 |
| JP | 2002133117 | 5/2002 |
| JP | 2002183456 | 6/2002 |
| JP | 2002329071 | 11/2002 |
| JP | 2002373259 | 12/2002 |
| JP | 2004013234 | 1/2004 |
| JP | 2004017901 | 1/2004 |
| JP | 2004059013 | 2/2004 |
| JP | 2004078393 | 3/2004 |
| JP | 2004240688 | 8/2004 |
| WO | WO 01/63445 | 8/2001 |
| WO | WO 01/63534 | 8/2001 |
| WO | WO 03/058381 | 7/2003 |
| WO | WO 03/065268 | 8/2003 |
| WO | WO 03/090130 | 10/2003 |

WO WO 2004/100043 11/2004

OTHER PUBLICATIONS

Butler, Driver Record: a Political Red Herring That Reveals the Basic Flaw in Automobile Insurance Pricing, 1989, Journal of Insurance Regulation 8: 200-234.*

Rejda, Principles of Insurance, May 1989, Longman Higher Education; 3rd edition, p. 230.*

Gallagher, Cecily. Risk Classification Aided by New Software Tool National Underwriter Property & Casualty Risk Benefits and Management, No. 17, Apr. 27, 1992, 19.

Dorn, Ritter S K Insurance Industry Databases Bases de donnees dans le domaine de l'assurance American International Group, Inc. United States Database: (Weston), vol. 21, No. 5, 1998, 68-71.

Apte, C.; Bing Liu; Pednault, E.P.D.; Smyth, P. Business applications of data mining Data Abstraction Res. Group, IBM T. J. Watson Res. Center, Yorktown Heights, NY, USA Communications of the CAM, vol. 45, No. 8, Publisher: ACM, Aug. 2002, 49-53.

Apte, C.; Grossman, E.; Pednault, E.; Rpsen, B.; Tipu, F.; White, B. Insurance Risk Modeling Using Data Mining Technology IBM Thomas J. Watson Res. Center, Yorktown Heights, NY, USA Conference: PADD99. Proceedings of the Third International Conference on the Practical Application of Knowledge Discovery and Data Mining, Publisher: Practical Application Company, Blackpool, UK, 1999, 209 Pages Conference: Proceedings of PADD99, Sponsor: Compulog Net, Intelligence in Ind., IF Comput., Integral Solutions, Logic Programming Associates, et al Apr. 21-23, 1999, London, UK., 39-47.

IrisNet: The 'Seeing' Internet, www.intel.com, 2005.

German, J. Portable structure tester may bring better-built homes, shopping malls, skyscrapers. Sandia Lab News. 51:2. Jan. 29, 1999. [Retrieved on Jan. 23, 2008]. Retrieved from Internet URL: <http://www.sandia.gov/LabNews/LN01-29-99/aser_story.htm>.

Office Action dated Feb. 12, 2008 for U.S. Appl. No. 10/656,479.

The Lowdown Ways to Reduce the Premium on Homeowner's Insurance; [Chicago Sports Final Edition] Diana McCabe, Knight Ridder/Tribune. Chicago Tribune. Chicago, IL: Aug. 25, 2000. p. 28 [Retrieved from Internet Apr. 27, 2007].

Nerad, Jack. Insurance by the mile. (Dec. 22, 2004) Retrieved from http://www.drivers.com.

Johnston, J. Vehicle's Black Box Holds Key To Crash (May 21, 2003). Retrieved from http://news.tbo.com.

Litman, T. Distance-Based Vehicle Insurance Feasibility, Costs and Benefits. Comprehensive Technical Report). Victoria Transport Policy Institute. (Jul. 8, 2004).

* cited by examiner

SYSTEM FOR THE ACQUISITION OF TECHNOLOGY RISK MITIGATION INFORMATION ASSOCIATED WITH INSURANCE

BACKGROUND OF THE INVENTION

1. Field of the Invention

This invention discloses a method and a computer system in combination with sensor technology located proximate to an insurable interest for transmitting, such as over the Internet, risk mitigation utilization data to a centralized database for analysis, publishing, underwriting, selling and managing insurance products.

2. Description of the Prior Art

A notable fact about insurance premiums is that they are billed in advance of the period of insurance during which the policy period runs. Insurance premiums are not set on the basis of the utilizing of technology, as viewed on a real time basis or by ascertaining the level of risk mitigation utilized during a particular period. If the degree of utilization and compliance regarding risk mitigation technology can be determined accurately, it provides for the option of setting premiums after a term during which the carrier has had an opportunity to measure compliance.

Underwriting is the process of establishing insurability and premium levels that will economically and profitably transfer risk from a policyholder to an insurance company.

In determining insurability and premium, insurance carriers take into account such factors as profit goals, competition, legal restrictions and the costs associated with losses (claims costs), loss adjustment expenses (claim settlements), operational expenses (commission and brokerage fees), general administrative expenses, and the cost of capital.

More particularly, an insurance carrier typically assesses a unit of exposure based on a premium, known and predicted exposure, and loss and expense experience. In this manner, carriers establish the basis of potential loss and the general direction of trends in insurance claim costs. The carrier establishes and subsequently adjusts premiums based upon the risks it underwrites. The premium is based upon damage to structures, vehicle accidents, human loss, as well as changes in claim costs, claim frequencies, loss exposures, expenses and premiums; the impact of catastrophes on the premium rates; the effect of salvage and subrogation, coinsurance, coverage limits, deductibles, coverage limitations or type of risks that may affect the frequency or severity of claims; changes in the underwriting process, claims handling, case reserves and marketing practices that affect the experience; impact of external influences on the future experience, including the judicial environment, regulatory and legislative changes, funds availability, and the modifications that reflect the impact of individual risk rating plans on the overall experience. However, notably absent from the factors customarily taken into account and one of the most profound influences in loss experience is the effect of technology. Therefore, an underwriting process that considers the continuing technology revolution would be anticipated to better assess loss ratios for insurable interests.

It is widely assumed that using various technologies may reduce the risks of loss associated with structures, vehicles and the cargo such vehicles carry. Consequently, state, local and national safety codes and regulations affecting such things as loads, use, performance and parameters (such as tire pressures), are constantly being revised to keep up with modern trends and technological advancements.

Beyond the requirements imposed through legal regulation, owners and those with insurable interests in structures and vehicles, may also employ systems that further militate against one or another loss or hazard. For well over a generation, the auto and trucking industry have mandated the use of seat belts and air bags to reduce injury losses from accidents. Many types of marine craft and aircraft have fire safety alarm and fire inhibitor systems that automatically trigger upon sensing a particular state of affairs, and thus minimizes fire damage and reduces human loss through early detection, central alarm, and appropriate response. Flame-retardant technology is widely employed in offices, homes, automobiles and trucks to reduce damage from fire. In some instances, one technology replaces another as to improve a condition that is inherently dangerous, but the replacement technology retains the fundamental objective of reducing damage. For example, asbestos has been virtually banned as a building material in favor of flame retarding products as a means for reducing fire hazards. As new hazards are discovered, newer technology will be incorporated to achieve the benefits of a safer society.

From a baseline related to minimum regulation and code requirements, underwriters of property casualty insurance factor into the risk/loss proposition items that relate to the structures, vehicles and cargos to be insured, (such as, the year of construction, type of construction, and its use. For cars, trucks and aircraft: miles traveled per year, geographic scope, the property's physical address, the existence of safety devices, such as air bags, seat belts, fire apparatuses, its current market and replacement value may be deemed pertinent. Underwriters also take into account items not directly related to the physical properties of the insurable interest, but that have been statistically shown to correlate with risk/loss as by way of example, the insured's credit rating, business industry codes, age of the structure or vehicle, owner's age and record of insurance claims, and the insured's driving record.

Contemporary underwriting practice is typically reduced to a binary choice to issue or not to issue a policy of insurance based upon the aggregate of statistically relevant underwriting criteria, rather than producing insurance products tailored to combinations of risk reduction technology. As such, the benefits of a class of technology may not be adequately considered during the underwriting process. Significantly, the ranges of efficacies associated with specific technologies within a class of technologies are ignored as salient facts. However, various classification schemes may be utilized to form associations that may represent a logical, qualitative, comparative or quantitative evaluation (collectively hereinafter referred to as a "difference") which difference may be assigned a weight typically referred to as a weighted difference, between the an unmitigated risk, and field a mollified risk.

A prime example might be an underwriting practice that does not factor in the functional details of available technology, such as by way of example: type of vehicle braking system or the corresponding brake performance, tire pressure, average accelerations and speeds, air bag detectors, fire detectors, and intrusion systems. For structures and cargos, such incidents as: radiation, chemical or biological hazards (such as the detection of explosive devices, illegal drugs or disease producing agents) may not be adequately assessed because no means exist by which such incidents can feasibly be reported.

Also, the current insurance underwriting practice does not factor in details on various actively responsive technologies that are currently available such as by way of example, the type (i.e. specific functionality) of the presence of chemical release systems to extinguish fires generally, gasoline fires in vehicles particularly, or products that automatically communicate medical emergencies from homes or vehicles.

In regards to vehicles, products as familiar as the common auto theft alarm system, fog lamps, air bags, blow out proof tires and anti skid braking and all wheel power systems, are available to consumers. Importantly, the current insurance underwriting practice does not factor in or discriminate between extant technology and actual, continuous functionality (monitoring) of relevant technology designed to reduce damage and insurance risks.

Stationary structures, such as buildings (e.g., commercial and residential), utilities (e.g., dams, bridges, power grids) and transports (e.g., automobiles, trucks and construction machinery, aircraft, and marine vessels, collectively, referred to as "vehicles"), as well as warehoused goods and cargo (collectively, "goods") do not typically incorporate devices, such a sensors that measure and transmit risk factors that may be useful to insurance underwriters. Such risk factors typically would concern the status of a building's existing fire apparatus, a vehicle's safety features or the manner in which a vehicle were operated. Such operating details may serve as important diagnostic markers relative to potential insurance loss. Little exists in the prior art that provides real time access to data regarding structures, vehicles or goods and to ascertain precisely what contributes to, safety hazards, safety violations, accidents and other property and casualty loses.

In the future a wide variety of products will employ diagnostic tools, measurement devices, detectors and sensors (collectively, "sensors") to ascertain the potential for risk and consequent loss, and whether such systems can arrest or ameliorate hazards to building structures, vehicles and goods, in addition to personal safety. Knowledge and the corresponding use of theses kinds of devices will lead to a safer environment and less expensive insurance premiums. To adequately and reliability factor in these advances into the insurance underwriting equation, a carrier must not only have information on the existence of the technology, but that the technology is properly installed and working.

Thousands of separate and distinct materials and products are employed in the use and construction of building structures and vehicles. Large numbers of these products have a significant impact upon personal safety and the ability of the insured interest to withstand catastrophic events. Architects, design and safety engineers and vehicle owners have considerable opportunity to chose among diverse products that might for purposes of discussion be separated into categories such as engineering materials, sensor technologies and responder technologies. An exhaustive list of products from these categories, relevant to loss prevention and mitigation could reasonably be expected to run into the millions of combination (e.g. more than 100 different materials times, 100 different sensor technologies times 100 different responder technologies). Various specific combinations may have corresponding efficacies with regard to the amelioration of loss. In each instance, the consumer would anticipate a corresponding premium to reflect the expected loss ratios attendant to using a particular product or combination of products (and might be influenced to make more economically sound judgments in incorporating materials/technologies that reduce damage/risk, if the benefit of such choices could be clearly articulated in costs savings from reduced premiums over the life of the material/technology in question).

However, as indicated, the insurance industry generally does not factor into its underwriting rules the reduction in risk with sufficient specificity to affect premiums or expand coverage that can be underwritten within acceptable loss premium ratios (either by increasing specificity as to exclusions, qualifying risk allocation based upon risk reduction technology or providing extended coverage under excess premium conditions).

Related to the problem of adequately accounting for working technology, the industry does not publish or otherwise make available to the consumer sufficient information on the underwriting process to allow the consumer to make informed choices on products and technology that may result in costs savings, both to the consumer and the carrier. In as much as classical underwriting depends to a large degree on statistics surrounding conditions relevant to loss, the difficulty in utilizing technologic innovation in the actuarial computations has to do with the small sample sizes and/or lack of data on the effect of a particular technology.

As apparent, the salient combination of technologies utilized in a structure or vehicle is typically vast, and searching for specific combinations and relating them to loss ratio and premiums is a time-consuming process utilizing current information processing systems. Nonetheless, such data rich environments may feasibly be handled utilizing expert systems and neural networks. See, U.S. Pat. No. 5,696,907 and U.S. Pat. No. 5,893,072.

SUMMARY OF THE INVENTION

The present invention relates to offering insurance contracts based upon a range of efficacies presented by employing suitable technology within a class of technology. The offered contracts specify a requirement or an incentive to employ a particular technology to militate against loss entitlement and a premium payable upon binding or as a function of utilization during a billing cycle.

In the present invention, one or more electronic means located in a building, vehicle or on goods having requisite interface devices, accumulates data from one or more observational devices, measurement devices, detectors, or sensors (collectively "sensors") related to physical points determinative of salient risk related information and transmits the information to a central computer for analysis.

The present invention deals specifically with a system and a process for determining the existence and the functioning of a set of technologies that mitigate certain insurable risks. To accurately assess the existence and function of certain technologies, the methodology herein described, observes, measures, detects and senses (collectively "senses") and establishes the metrics required to assess features, benefits, and qualities to effectuate an improved insurance underwriting system related to insuring structures, vehicles and goods.

When a carrier can accurately access the utilization of a spectrum of risk mitigation technologies, as viewed in real time, it provides for the option of setting premiums after a term during which the carrier has had an opportunity to measure compliance. With a real time record of utilization, the premium can be established as a time related function of utilization, whereby premiums include terms relating to the utilization of technology:

$$P_{tot}=P_B(x)*P_t(t)$$

Where: $P_{tot}$ is the total premium due at the beginning or the end of a period;

$P_B$ is a function of a base premium established on the basis on non-technology issues;

$P_t(t)$ is a function of premium based on the use of a salient technology; and t is the interval, during which the technology is in use.

In one embodiment of the invention, once the insurance policy has been issued, the insurance carrier can monitor the insurable interest for compliance with the various conditions set forth in the policy as these relate to the utilization of quantifiable risk mitigation technologies. For example, the risks that attend a moving vehicle depend on a myriad of factors such as its use, its speed, the design of the chassis and body, the fuel type and storage, the gross weight, the load, the tire pressure, braking system, the route traveled, and the driver's observance of highway safety (speed, lights, seat belts) to cite but a few of the important factors. Once the vehicle has been insured, the carrier has an interest in checking that risk mitigation technologies associated with these parameters remain operable.

One aspect of the invention is drawn to a system of sensors that can determine the salient factors that influence a building's (commercial or residential) or vehicle's risk aversion characteristics. Sensed data is collected for the insured interest and transmitted to a remote centralized database for analysis to ascertain whether the subject property is operating within standards developed either theoretically, from models, or from the universe of properties (buildings, vehicles), from which representative data has been collected and analyzed.

Upon transmitting the data, a centralized computer performs an analysis of the insurable interest that typically leads to a hypothetical loss experience. Thereafter, the system generates reports containing summaries of the data in the form of listings, graphs and correlations regarding a specific safety or lose performance against a pooled performance or subpopulations of structures and vehicles, based on similar construction, types structure or vehicle, loads, locations and use, etc.

For both structures and vehicles, the acquisition of data must be automated to feasibly carry out the process of monitoring the effectiveness of a particular technology. But, the amount of data collected can be anticipated to be large. To this end, the centralized computer and accompanying databases can be a part of a larger expert system where data is acquired and analyzed to produce meaningful actuarial data to underwriters. For example, vehicle sensor data acquired from a fleet of similarly situated vehicles, such as brake performance, average speed, and other safety factors for similar vehicles, traveling over similar routes is collected statistically significant categories (e.g. means, standard deviations, variances). The record of pooled statistics form a basis to compare specific vehicles to vehicles in the fleet pertaining to specific insured vehicles. The pooled performance creates a normal population and essentially a standard for future comparisons. An insurance analyst might, for example, use the pooled performance to draw attention to a vehicle that begins to fall outside some statistically significant boundary related to risk.

The location of structures is easily determined and established as a constant in the present invention. However, because vehicles and other insurable interests such as cargos, by definition are non-stationary, a need exists to associate the technology with a global position. There may be differences among vehicles operated in similar manner based on the effects of global position, and to that end sensors capable of establishing a global position, such as the Global Positioning System and related vehicle devices are included in the group of available sensors. In accordance with these differences as they may relate to safety, the system employs devices and methods for estimation of underwriting premiums for a vehicle over a chosen route or particular cargo. Insurance costs bore by a carrier over each road, air lane or marine lane segment can be estimated, using information on one or more of the following previously collected variables: actual insurance loss, safety programs, and operation details related, by way of example, to stationary locations, routes traveled, actual inclines and declines along the route, vehicle, length and condition of the traveled segment; actual condition of the segment; or the resistive or drag component due to the medium, speeds attained and where relevant altitudes and weather conditions.

For certain vehicles other variables need to be taken into account such as traffic density along the road segment; applicable constraints such as high altitude or excessive inclines along the route; and typical weather conditions.

In one embodiment, the sensed data is accumulated in a computer located in the building (commercial or residential) or vehicle, where various calculations regarding quantifiable safety performance variables may be made and given corresponding values. The data obtained is then formatted for transmission and transmitted to a computer site for further analysis. The invention contemplates that the system designer will decide, based on the efficiencies and practicalities of the particular system, where the most advantageous place to perform calculations reside.

The system of the present invention as it relates to vehicles accumulates data in real time from sensors that measure brake performance, tire pressure, fuel rates of consumption, acceleration, drag on the vehicle, trip time, idle time, and other pertinent parameters and variables to monitor the overall performance of the vehicle's operation. In the case of structures, sensors measure the function of smoke detectors, fire detectors, water level detectors, mold detectors, intrusion systems, radiation, chemical or biological hazard detectors (such as the detection of disease producing infectious agents, causing viral infections or the presence of allergens related to common allergies and forms of sinusitis).

The outputs of each of the sensors are sampled to provide data representing the magnitude of each of the sensed characteristics at a particular time. The sampled data for each sensor is then accumulated in real time, so that subsequently, one can analyze safety related devices or system loads that are important diagnostic safety markers as they occur.

In the local or the central computer or in the combination of both computers, the data is analyzed and pertinent operational data is produced. In the case of vehicles pertinent data may include: trip time, idle time, driving time, frictional drag due to tire deformation and the lubricants of the vehicle and other pertinent information relevant to vehicle operation. The system may also measure and indicate the forces being produced by a vehicle's prime mover at any instant, accounting for acceleration, average speed, braking frequencies, aerodynamic (frictional and viscous drag) in addition to gravitational and inertial acceleration factors which may be relevant in certain marine or aircraft operations. An electronic audit trail and data regarding these and other such elements provide an indication of the vehicle's overall compliance and insurance contract performance.

The safety and risk aversion in marine and aircraft are partly related to the density of the medium of travel, medium currents (air, fluid), wind resistance, surface friction as well as the effects of motion in terms of vibration in any axis, pitch, yaw and roll. Some of these variables will be related to the vehicle or crafts design and more specifically its aerodynamic, marine dynamics, and hull or chassis design. When a craft exceeds its design specification, risk of loss increases. The invention herein contemplates the use of sensors that monitor the design limit established for such craft.

The system allows indication of as many variables as required to determine instantaneous loads on the vehicular system. These variables may also be sensed, formatted and transmitted to a local computer or central site computer for further statistical analysis and underwriting decision-making.

Typically, a central site computer initiates the remote site polling process through a sampling cycle that telephones or broadcasts a signal, which typically includes a digital address unique to the insurable interest such as a residential home or vehicle, which accordingly acknowledges contact. Thereafter the central site transmits a digital start code, which is interpreted, by a communications controller situated in the home or automobile, to initiate a sampling of the sensors, which measure a unique physical state or property. In yet another embodiment, the central site computer initiates a communication, as it might by utilizing a radiotelephone over the Internet and thereafter, transmits a digital start code, which is interpreted by the communications controller to initiate a sampling of the sensors, to measure a unique physical state or property. In another embodiment, regardless of whether the central site computer initiates the measurement process, the central site computer simply polls or requests transmission of data that has been collected during some predetermined time interval by the insurable interest's computer and stored as data records.

In order to provide analysis of the data the accumulated sensor data may be transmitted to a central site where programming means convert the partially processed or raw accumulated sensor data into standard units of measure so that it can be analyzed and displayed or printed in a meaningful manner. The data from various sensors is also combined to derive data representing additional safety related devices or system loads that are important diagnostic safety markers. Further, the data from various types of sensors is statistically correlated, so that relationships between diverse profiles may be ascertained. Statistical analysis of the data is also carried out to determine the mean and variances and other statistical parameters that best reflect the pooled performance as well as similar data analysis to determine the time rate of change of safety performance. The data summaries may take the form of data listings or graphs such as histograms. In one aspect of the invention, collected data at a central site may be made available to a variety of different users via a variety of presentation modules through use of data-interfacing programs. The data also may be available over a computer network such as the World Wide Web via a server designed to present the data in an appropriate format for the network. This format may include graphical data, text, sound or other multimedia format. More specifically, the system includes the ability to collect sensor data, numerical data, textual data, graphs, and pictures to the structure or extent the structural or vehicle is equipped with such information gathering technology; to superimpose the sensor data, numerical, textual and graphical data on said pictures; and to communicate the image to the central site. In this case, real-time images collected by a video camera at the same time as the sensor data is being collected, may be stored for reference.

An advantage of the present invention is that it can collect data from multiple transports in a fleet and to communicate that data to a central processor; automatically process that data into predetermined informational subsets, all in real-time or off line. Another advantage is that the system is programmed to operate in as a real time, windows-based (or similar) software environment. It is also contemplated that the system will support foreground, background data processing and thereby permit multiple executable files (or processes) to run simultaneously on the central site or local computer. Thus, the central site computer can display in real-time, data screens from structures, vehicles and goods, while receiving and processing new sensor data.

DESCRIPTION OF THE DRAWINGS

The novel features of the present invention are set forth with particularity in the appended claims. The invention itself, however, both as to its organization and method of operation, together with further objects and advantages thereof, may be best understood by reference to the following description taken in conjunction with the accompanying drawings, in which:

DESCRIPTION OF THE PREFERRED EMBODIMENT

In the figures to be discussed, the circuits and associated blocks and arrows represent functions of the process according to the present invention, which may be implemented as electrical circuits and associated wires or data busses that transport electrical signals. Alternatively, one or more associated arrows may represent communication (e.g., data flow) between software routines, particularly when the present method or apparatus of the present invention is implemented as a digital process.

Figure 1:
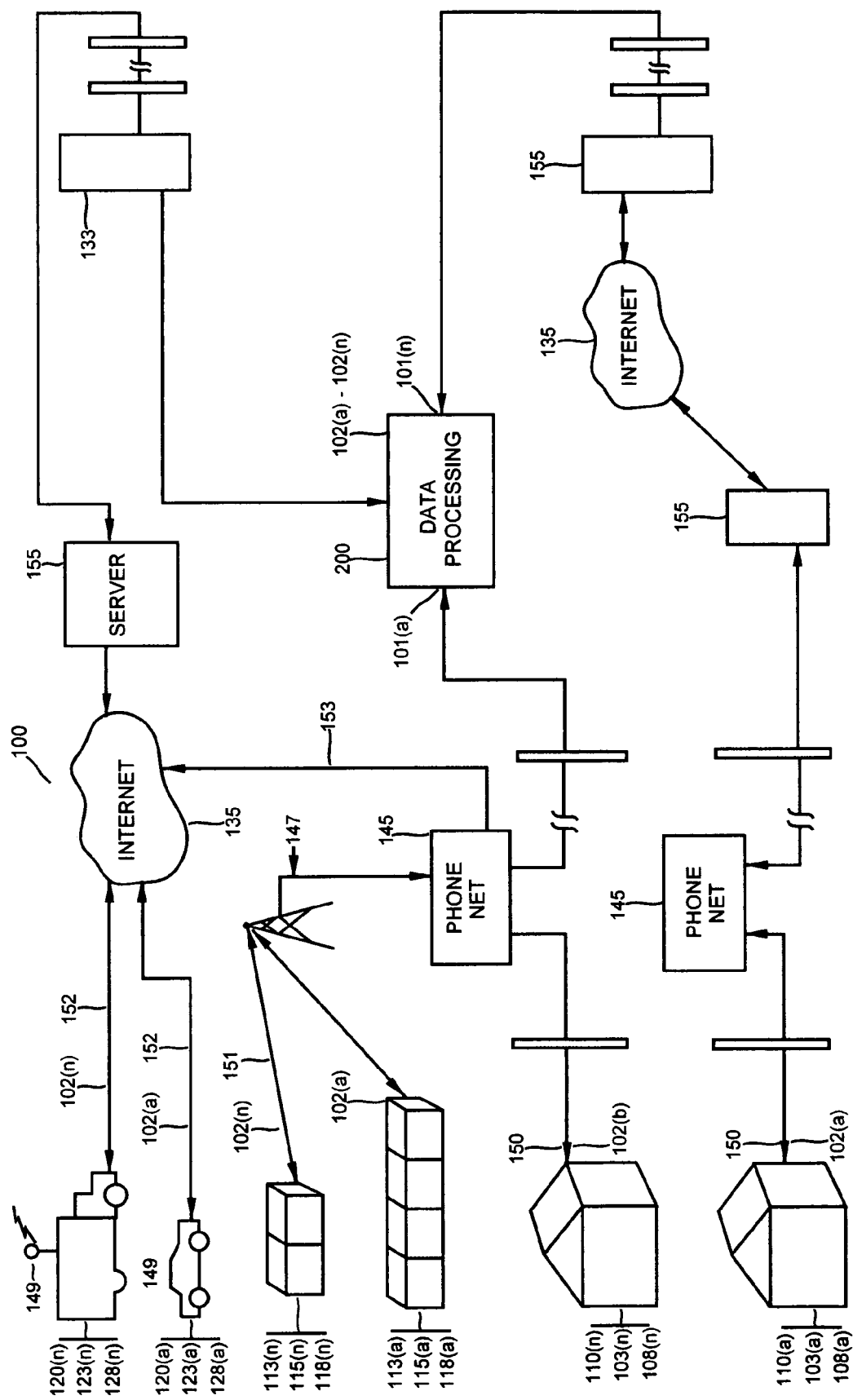
FIG. 1 is illustrates a system, which communicates safety or risk aversion data to a central site computer for analysis.
Figure 2:
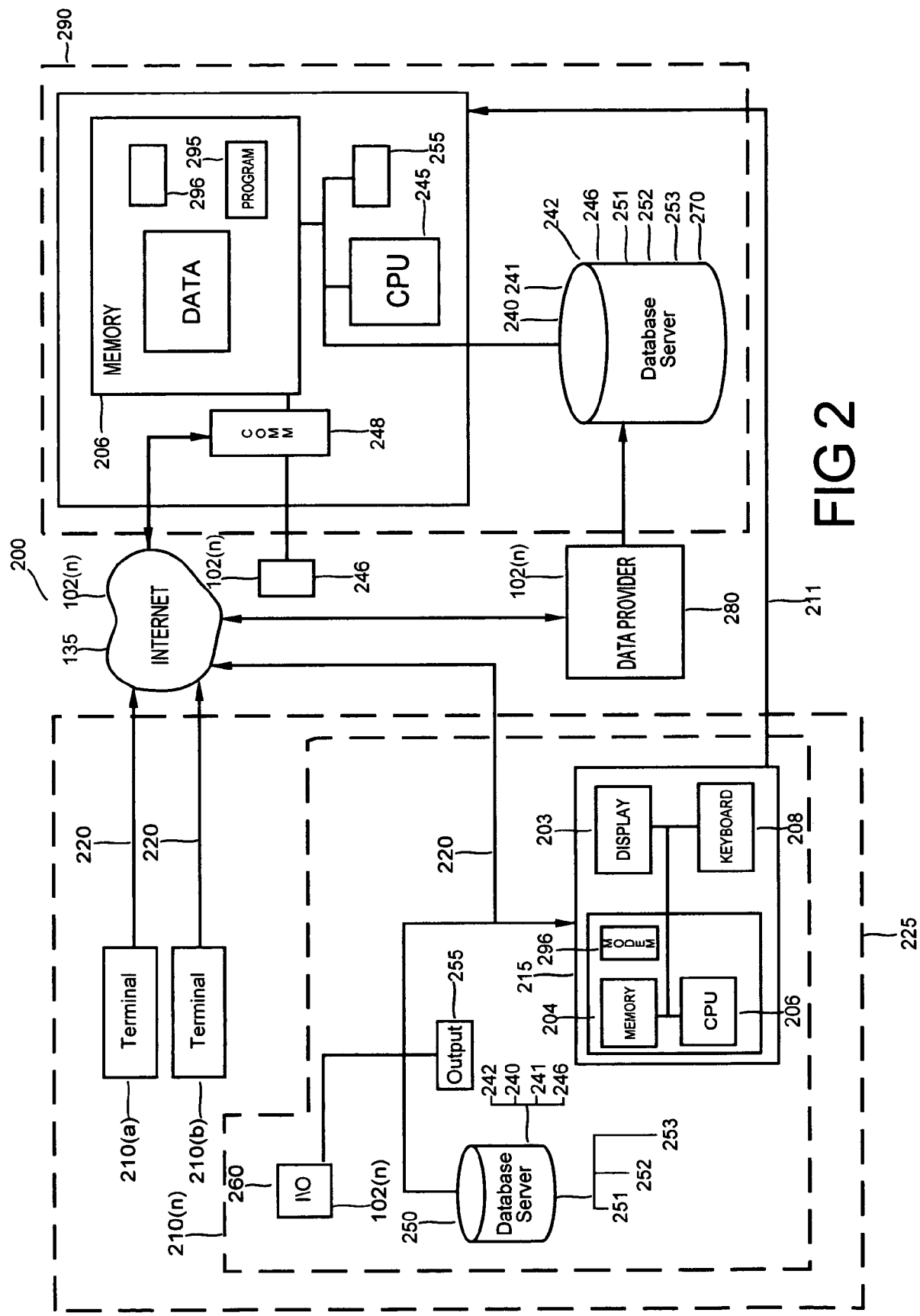
FIG. 2 shows a block diagram of a computer system for receiving sensor data and underwriting, quoting, binding and billing for an insurance policy.

With reference to FIG. 1 and FIG. 2, the sensor data communication system 100 includes, a system 200, which includes local area terminals 225, having a database file server 250, input devices 208 and output devices 203, including such telecommunications as may be located in modems 260, or in a related set of terminals 210a(1) through 210(n) configured by software for accumulating, processing, administering and analyzing insurance in an automated workflow environment. Additionally the system is in communication with a data processing center 290, either through a data connection 211 or via an Internet 135 connection. Significantly, the system is equipped to poll remote sites, such as structures 110(a) through 110(n), vehicles 120(a) through 120(n) and goods 115(a) through 115(n). Each of the foregoing structures, vehicles and goods, contain electronic devices, such as computers, data acquisition means and telecommunication means (collectively, "computer (s)") that serve to interrogate and control sensors 108(a) through 108(n), 128(a) through 128(n), and 118(a) and 118(n), respectively.

The system 200 utilizes one or more software programs 295 for on-line quoting, rating, and binding of insurance policies, electronic data transfer and the evaluation and access the data resources, such as data base file sever 270 containing, among other things, technology information pertinent to reducing costs associated with certain avoidable hazards and losses. The communication means 248 provides for real time on line polling of sensors installed at the sites 110(a) through 110(n), vehicles 120(a) through 120(n) and goods 115(a) through 115(n) utilizing the internet 135 connection or other suitable electronic communications means, such as telecommunication means 246. The system also provides for publication of the quantitative effects of one or more technologies upon the underwriting process, based upon inquiries, specifying a range of variables related to technologies incorporated into the data stored on database file server 250 or optionally database file server 270.

The sensors 108(*a*) through 108(*n*), 128(*a*) through 128(*n*), and 118(*a*) and 118(*n*) data is transmitted 150, 151, 152 over various means available, such as over a public telephone network, 145, private radio/telephone cellular telephone service 147, or radio communications link 149. In any of the various communication instances, the transmission may proceed over the Internet 135 utilizing appropriate connectivity as provided for by wireless communications or through telephone land lines 153 and servers 155 and any one of various standard file transfer protocols such as FTP, TCP/IP with PPP or SLIP standard connectivity. The foregoing description of system 100 and system 200, as configured, is by way of illustration and example only, and is not to be taken by way of limitation, the spirit and scope of the present invention being limited only by the terms of the appended claims.

System 200 receives the sensor 108(*a*) through 108(*n*), 128(*a*) through 128(*n*), and 118(*a*) and 118(*n*), input data 102(*a*)-102(*n*) for purposes of analyzing, underwriting, quoting, binding and billing as each relates to an insurance policy. The processing of the information is carried out in the terminals 210*a*-210*n*, each having a corresponding CPU, display, memory and input devices, such as CPU 206, display 203, memory 204 and keyboard 208. The system 225 and the system 290 are typically used in conjunction for underwriting, creating, selling and managing insurance policies. In addition, the database means 250 interconnected to the terminals 210(*a*)-210(*n*) stores predetermined underwriting rate data. Output means 255 produces documents in at least one of text, graphics, and electronic transfer mode, said output means being interconnected and responsive to CPU 245 and CPU 206. The plurality of terminal means, such as terminal means 210(*n*); and, a corresponding input means 208 provides user data input to the CPU 206, and a software means (unshown) for configuring each of said plurality of processor means 206.

Device 260 represents one or more input or output devices, such as other facsimile machines that have access to rate filings, which may be stored on database 250. Input/output source 215 also communicates with one or more network connections for receiving data over network 220, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

Other computer systems functionally equivalent to system 290, may be in communication through Internet 135 or through line 211 with terminals 210(*a*)-210(*n*). System 290 and terminals 210(*a*)-210(*n*) are in communication with database means 270, to store sensor data 102(*a*)-102(*n*). The database server means 270 also contains underwriting rate information and stores information related to hazard ratings for any suitable purpose in underwriting, and managing insurance policies in connection with the publication of the quantitative effects of technologies upon the underwriting process.

In addition to on-site databases, such as database means 250 and database means 270, data may be provided from a data provider 280 that may, by way of example, accumulate, sensor data 102(*a*)-102(*n*); and store and forward such data to the computer system 200.

As will be apparent to those skilled in the art of computer software, the programming language, and where and on what computer the software is executed is a design choice. The foregoing description of system 200 as configured is by way of illustration and example only and is not to be taken by way of limitation, the spirit and scope of the present invention being limited only by the terms of the appended claims.

Figure 3A:
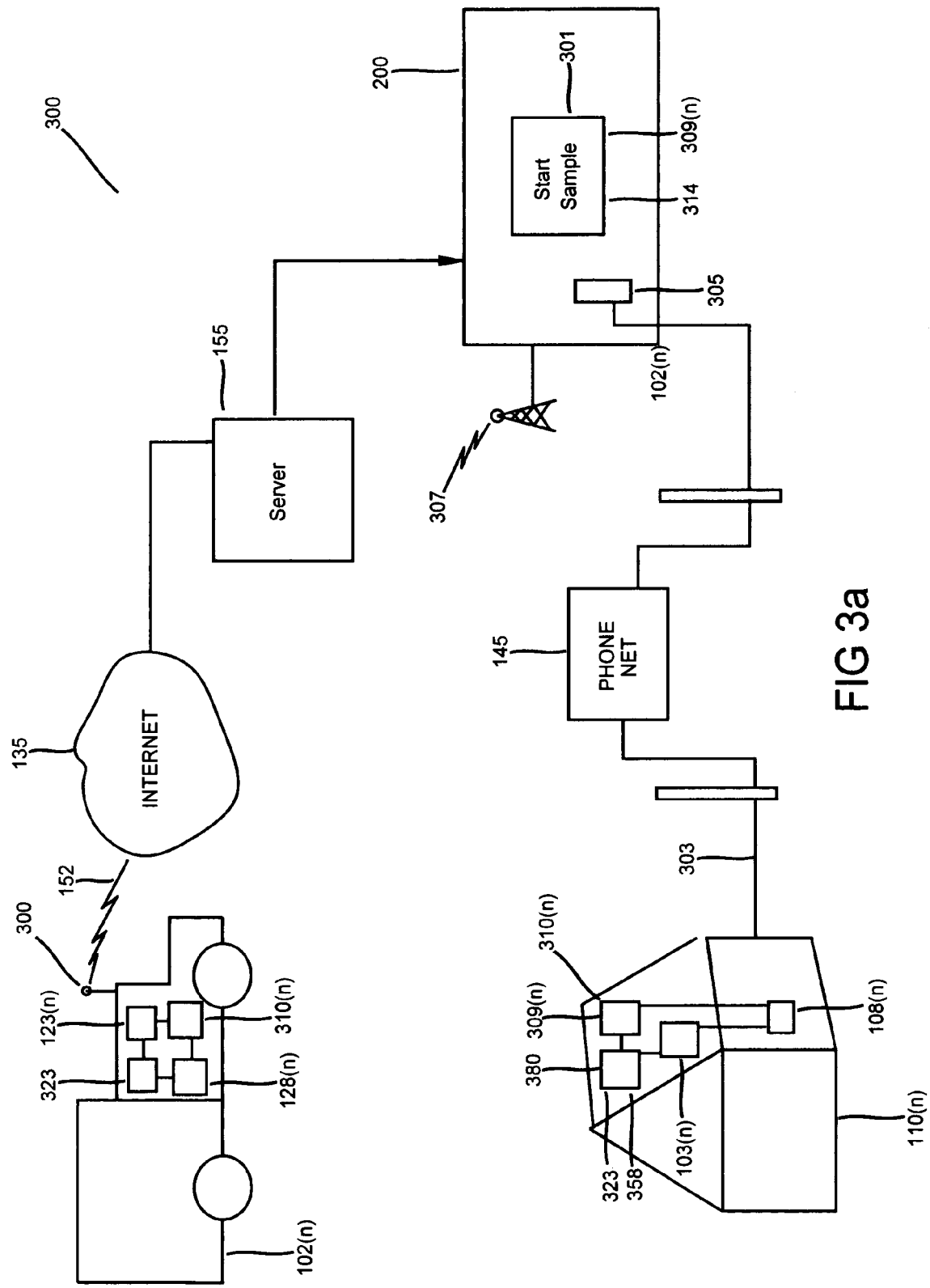
FIG. 3a is an illustration of a polling system implemented in conjunction with system 100 and system 200.
Figure 3B:
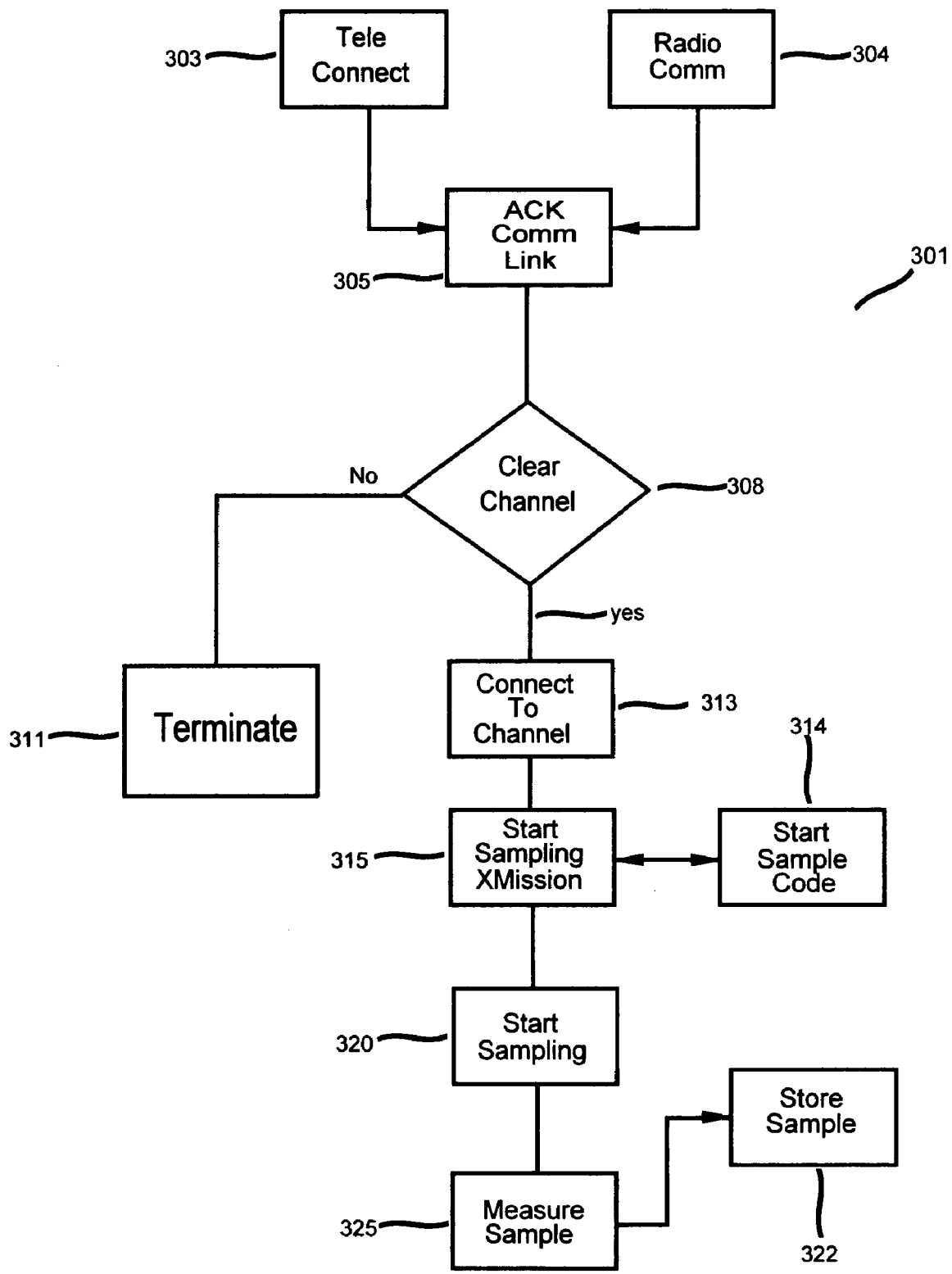
FIG. 3b is a block diagram or the polling process.

Referring to FIG. 3*a*, the system 200 initiates a polling process 301 to acquire sensor data 102(*a*)-102(*n*) from one or more sensors 108(*a*) through 108(*n*), 128(*a*) through 128(*n*), and 118(*a*) and 118(*n*). In FIG. 3*b* system 200 initiates a sampling of a one or more sensors 108(*a*) through 108(*n*), 128(*a*) through 128(*n*), and 118(*a*) and 118(*n*), via a telephony connection 303 or a radio communication 304. One of a plurality of communication controllers, such as controller 310(*n*), having a corresponding digital address 309(*n*) unique to the insurable interest accordingly acknowledges the establishment of communications between the system 200 and the sensor 108(*n*). The communication controller 310(*n*) responds 305 by connecting 313 the system 200 to the sensors 108(*n*). The process 301 checks whether transmission errors prevent further communications, and if a connection cannot be made the process 301 terminates 311. System 200 reports the event as unprocessed sensor data. The system is then free to call another address.

When a connection 313 has been established, the system 200 responds by transmitting 315 a start sampling code 314, which is interpreted, by the communications controller 310(*n*) and which responds by initiating 320 a sampling of the sensors 108(*n*), resulting in measuring 325 and storing 322 a condition, state of affairs, physical property or assessment of the insurable interest.

As will be appreciated by those skilled in the art of telecommunications, various means are available to acquire the sensor data 102(*a*)-102(*n*). In an aspect of the invention, regardless whether the system 200 initiates the determination sequence, the system 200 may poll and request transmission of data that the sensors 108(*a*) through 108(*n*), 128(*a*) through 128(*n*), and 118(*a*) and 118(*n*) collected during a predetermined time interval by the insurable interest stored as data records 323.

Figure 3C:
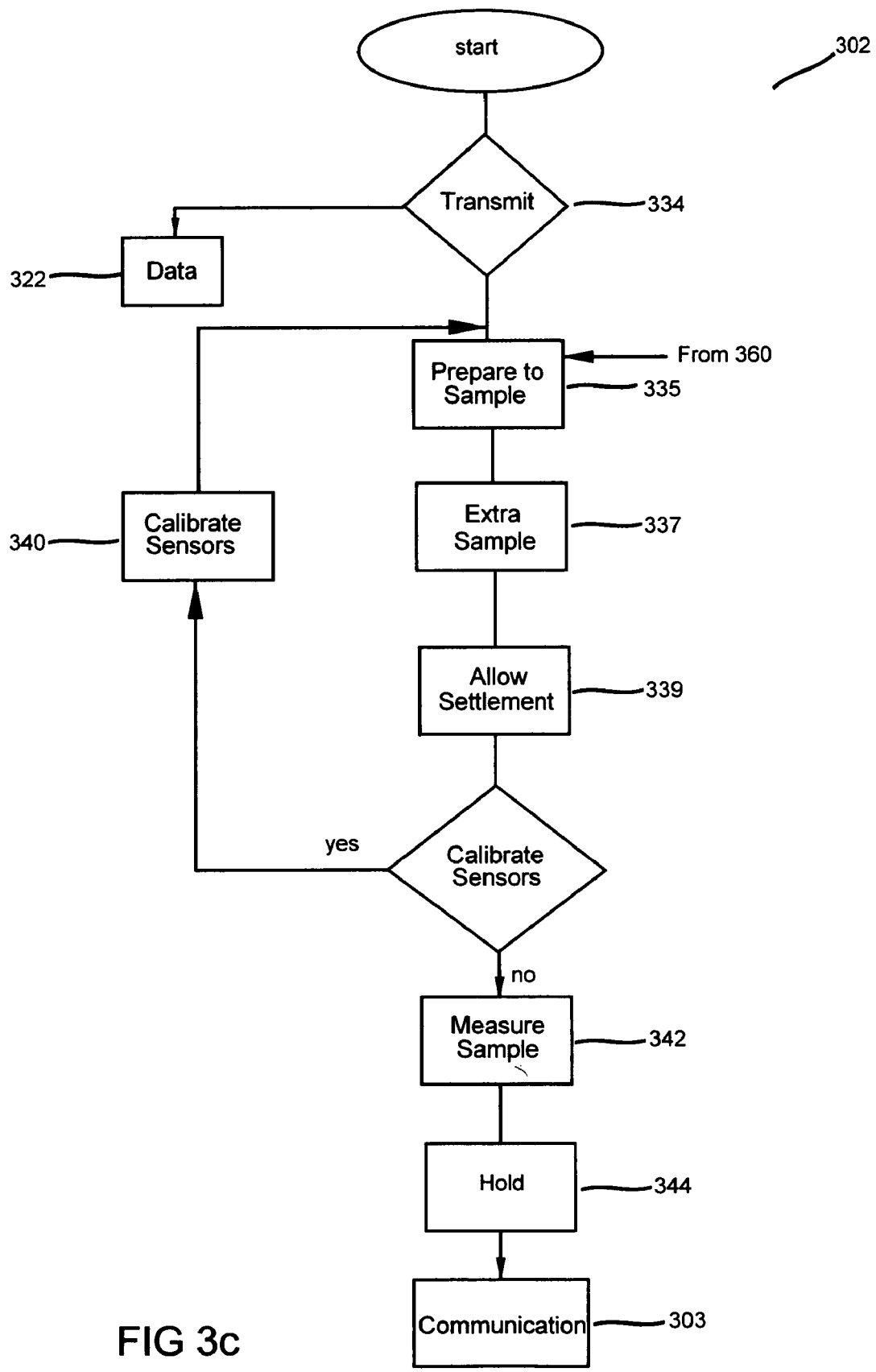
FIG. 3c is a block diagram or the polling process.

Referring to FIG. 3*a* and FIG. 3*c*, electronic means 103(*n*) responds to system 200 polling process 301 by initiating a sequential operation: (1) to determine 334 whether to transmit data previously collected 322 and stored 323 or (2) (a) to prepare to sample 335 the selected sensor 108(*a*) through 108(*n*), 128(*a*) through 128(*n*), and 118(*a*) through 118(*n*); (b) to extract a sample 337 during a prescribed time interval; (c) optionally to permit the sample to settle 339, during a second time interval; (d) optionally to calibrate 340 the sensors 108(*a*) through 108(*n*), 128(*a*) through 128(*n*), and 118(*a*) and 118(*n*), if required; and (e) to measure 342 the sample utilizing the sensor 108(*a*) through 108 (*n*), 128(*a*) through 128(*n*), and 118(*a*) and 118(*n*); (f) hold 344 sensed data 102(*a*)-102(*n*).

Figure 3D:
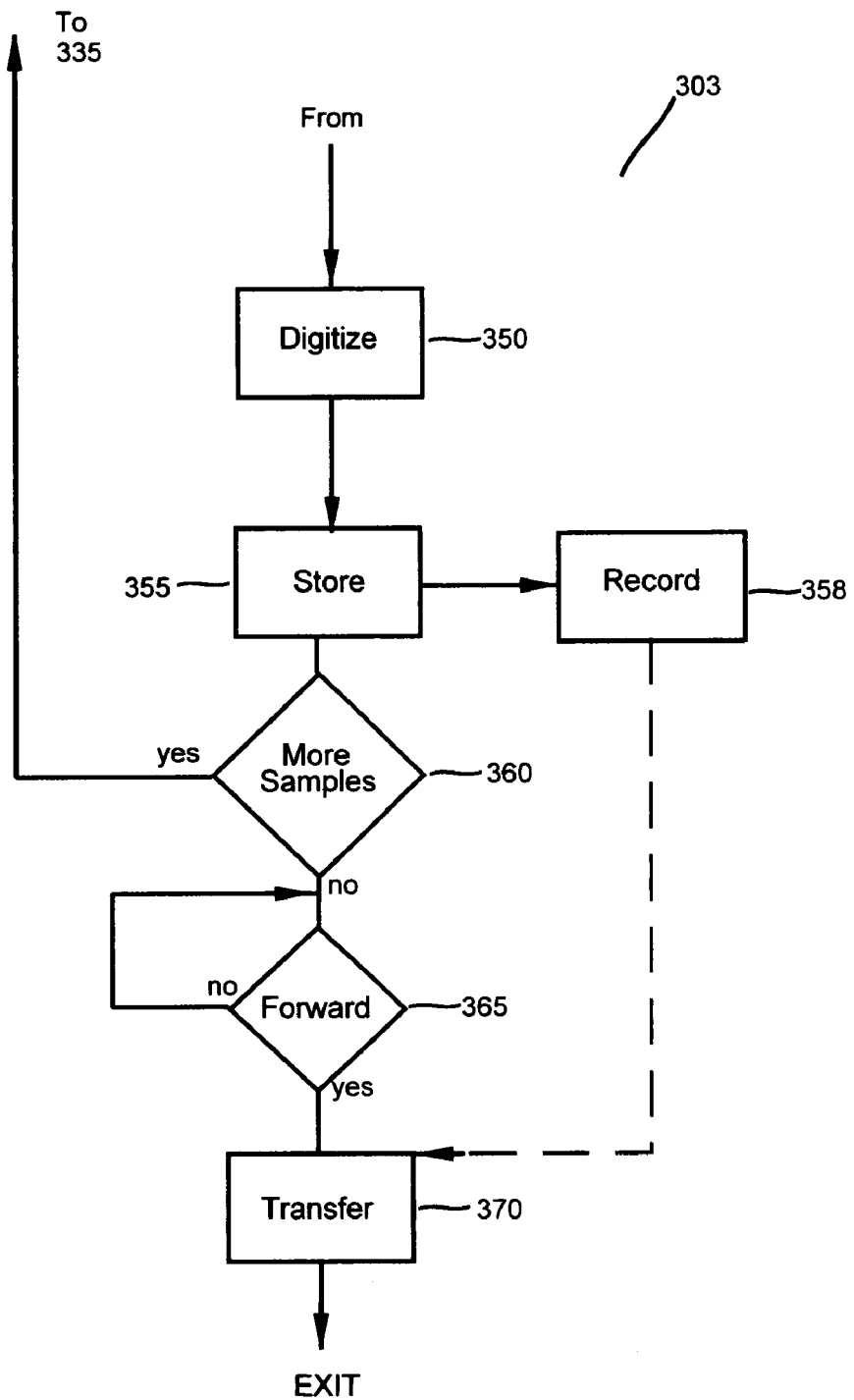
FIG. 3d is a block diagram or the polling process.
Figure 3E:
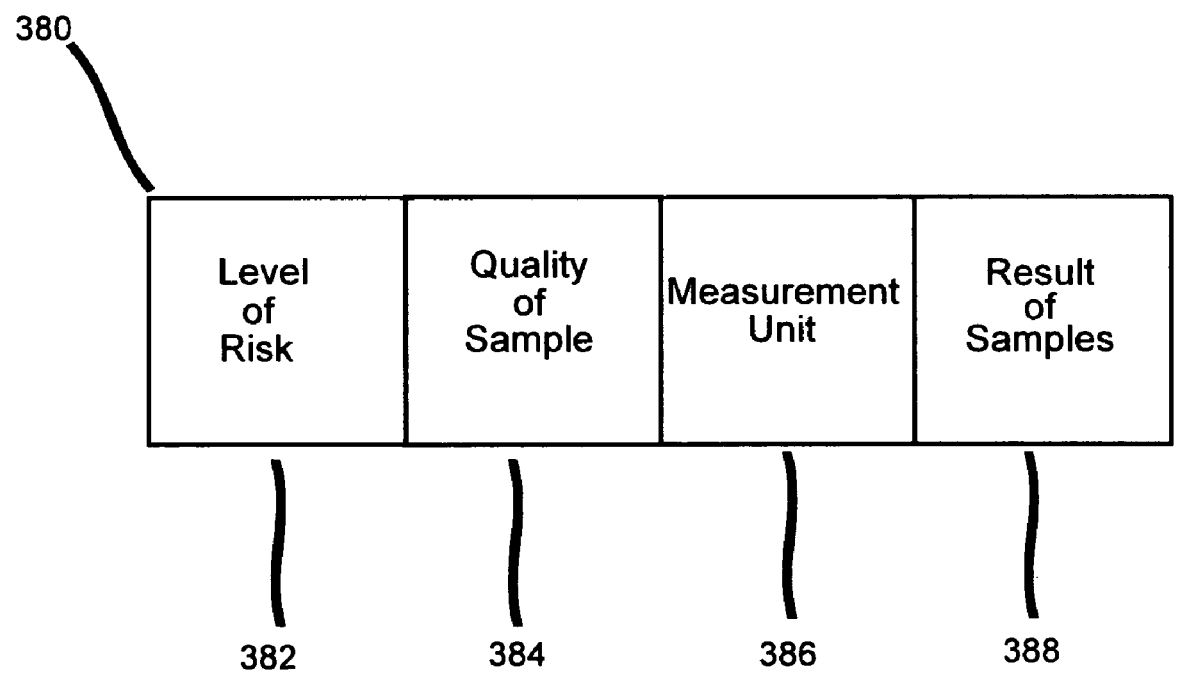
FIG. 3e is a format or a record containing sensor data.

As shown in FIG. 3*d*. the system 300 optionally proceeds to (h) digitize 350 (if the sensed data is analog) and store 355 a digital result in a record 358; (i) continue the sequence from decision point 360 through 335, until the predetermined sampling period or decision 360 indicates the last sample 360; (k) await a forward command 365 from the system 200 requesting the transfer of data from the record 358 store to the system 200. Thereafter, the record 358 is transferred 370 to the system 200 via the particular network transmission protocol as discussed above.

In one embodiment of the invention, the sensors 108(*a*) through 108(*n*), 128(*a*) through 128(*n*) and 118(*a*) through 118(n), measure the status or degree of conformity or compliance with a standard unit of safety or risk mitigation and produces a data file 380, comprised of a plurality of records containing: (a) an indication of the conformity to a prescribed level of risk of safety or risk mitigation; 382 (b) an indication of the quality of the sampled unit, 384; (c) a metric relating to the quantity under consideration 386; and (d) the result from a predetermined number of samples 388.

In order to provide analysis of the data, the record 323, record 358 and the data file 380 may be transmitted to the system 200 where a program 296 converts the partially processed or raw data 102(a)-102(n) into units of measure, so that it can be analyzed, displayed at display 203 and printed at device 255. The data from the sensors 108(a) through 108(n), 128(a) through 128(n) and 118(a) through 118(n) is combined at the system 200, to derive data relevant to diagnostic risk and safety markers. Further, the data from sensors 108(a) through 108(n), 128(a) through 128(n) and 118(a) through 118(n) is correlated to diverse data sets and underwriting profiles residing on system 200 database 250, database 270. Statistical analysis of the data is also carried out to determine the mean and variances and other statistical parameters that reflect the pooled performance, as well as data analysis to determine the time rate of change of a safety performance and risk mitigation effectiveness. The data summaries may take the form of data listings or graphs, such as histograms.

According to the invention, collected data in database means 250 database means 270 may be made available to a variety of different users, via a variety of presentation modules through use of data-interfacing programs. The data also may be available over the network 135 to present the data in an appropriate format for a user. This format may include graphical data, text, sound or other multimedia format. More specifically, the system includes the ability to collect sensor data 102(a) through 102(n), numerical data, textual data, graphs, and pictures related to the structure 110(a) through 110(n), vehicle 120(a) through 120(n) goods 115(a) through 115(n) and to combine the data on various media to further the intents of the invention herein.

Figure 4:
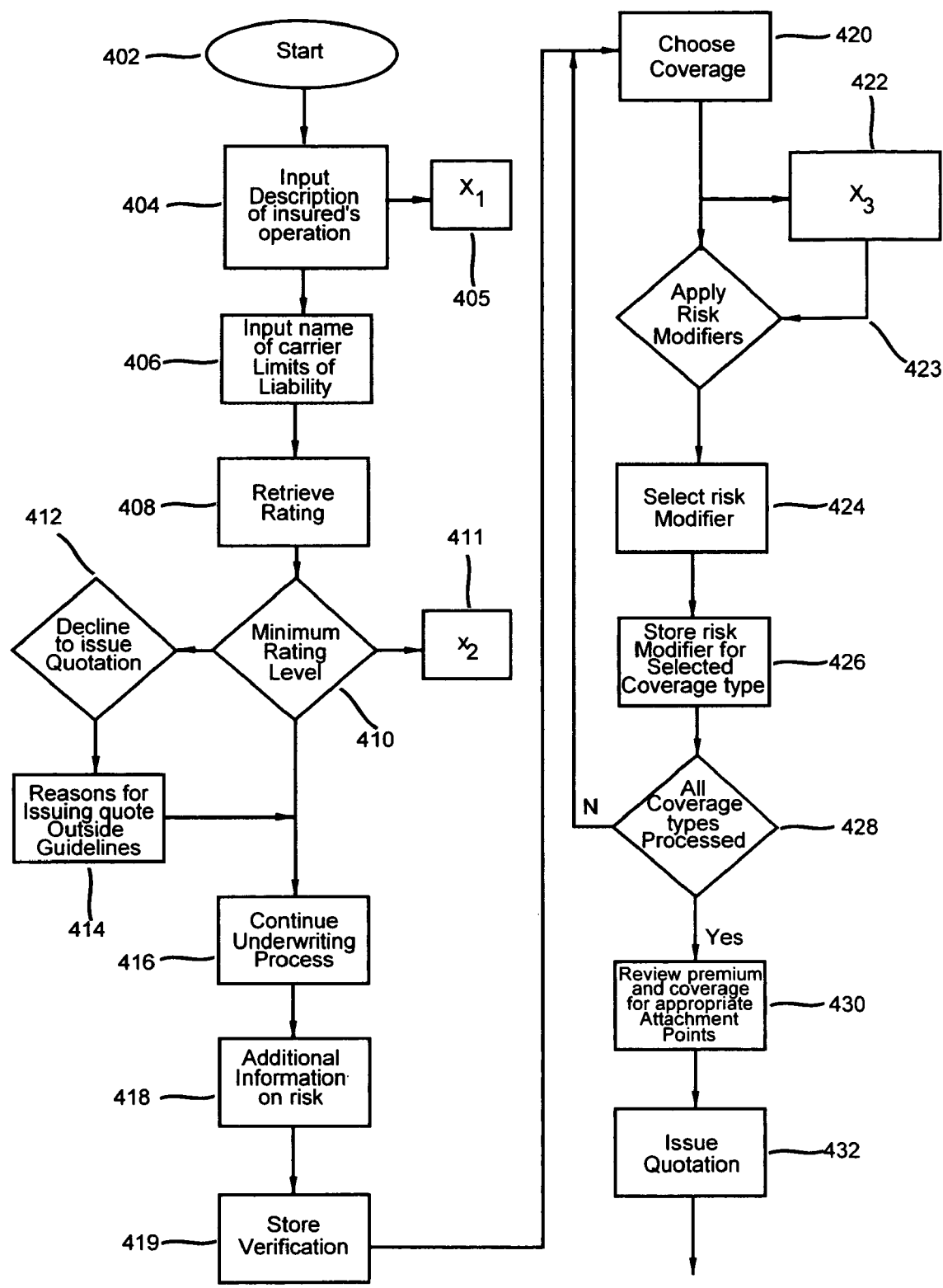
FIG. 4 shows a block diagram of the logical organization of the methodology used in the invention as it relates to underwriting, quoting, and binding an insurance policy.

Referring to FIG. 4 a flow chart illustrates the operation of a software system 400 for underwriting, quoting, binding, issuing and managing insurance policies, by an insurance underwriter of a casualty and property insurance dependent upon the technology existing within the insurable interest, in accordance with a preferred embodiment of the present invention. Software system 400 is preferably implemented on the computer systems, 225, 290 such as illustrated in FIG. 2. In the present instance, the system 200 allows users to access system 400 to perform underwriting functions; quote policy coverages and premiums, and to create casualty insurance policies. The foregoing descriptive process of system 400 is by way of illustration only and is not to be taken by way of limitation, the spirit and scope of the present invention being limited only by the terms of the appended claims.

Although the following description will refer to a system for the generation of a commercial property and casualty lines of insurance for structures, vehicles, and goods, an equivalent process is applicable to any insurable interests where the underwriting criteria and the premium are influenced by the absence or presence of technology. In referring to FIG. 2 and FIG. 4, A process 400, a user in a first step 402, through input device 208, logs into system 200 through the associated terminal 210(n) having the display 203, that connects to a database means 250, providing first and second data bases. In the next step 404, utilizing the input device 208, the user enters quotation information pertaining to the insured party for whom casualty insurance dependent upon the technology is to be underwritten. Such information typically includes, the name, address, telephone number of the insured party, the date the request for the quotation was received, a description of the insured's operation and the standard industrial codes ("SIC"), which are associated with the insured's business.

The process 400 selects and stores at least one SIC associated with the business for which the property is used. A plurality of SIC records corresponding to a plurality of SIC are stored in a database resident in a database means 250 and database means 270. Each of the SIC records are linked to underwriting guidelines (unshown) established and filed by the insurance carrier. These criteria include guidelines related to minimum premiums, hazard rating, underwriting authority, and referral criteria. The process 400 displays, on display 203, a plurality of candidate risk modifiers associated with one or more technologies that mitigate the risk of loss or hazards associated with the insurable business property and the retrieves the SIC record for documenting and storing a selected risk modifier code and related underwriting criteria associated with the business property and associated policy. The process 400 develops the quotation using a detailed description of the insured's operation, the minimum premium information, the selected hazard code, the selected risk modifier code 405, and primary insurance limits.

In step 405 a user retrieves a risk modifier code 240 developed from the analysis and determination of the mitigating effect a technology on the insured risks. The risk modifier code 240 is an actuarial function of the mitigation of risk due to the incorporation of specific technology. The risk modification value of the code 240 may be further modified by the actual use of the technology as assessed by the acquisition of sensor data 102(a) through 102(n).

The process proceeds to step 406, where the user enters the name of the carrier, the coverage type and coverage limits of the insurance policy. Since the underlying insurance policy may have separate limits for general liability and specifically named liability coverages, the insurance policy producer may enter separate primary coverage limits for general liability and specific liability coverages in this step. In step 406, the user enters the expiration dates of the proposed insurance contract and a description of the insured property.

In step 408, the process 400 retrieves from a first database 242 resident in database means 250 and 270, public bureau rating information. The present invention maintains a database, which contains a rating means for storing information relating to the potentially insurable risk, mitigated by a technology in the second database 246. In step 410, the rating associated with the insurance carrier, which will underwrite the casualty insurance being quoted, is compared against a predetermined minimum technology-rating threshold established by the carrier issuing the insurance quotation. The process 400 takes into account the risk modification in step 411 where a second risk modifier code 241 factors into the decision the effects of the mitigation of risk due to the incorporation of specific technology. Notably the risk modification code 241 may be determined by the actual use of the technology as assessed by the acquisition of sensor data 102(a) through 102(n). If, as a result of this comparison, the system 400 determines that the rating of the insurance carrier is below the predetermined threshold, the system proceeds to step 412, where the insurance underwriter may decline to issue a quotation or refer the submission to a managing authority for further consideration. If the user declines to issue the quotation in step 412, then the process 400 generates a declination letter, indicating that no quote will be submitted for the casualty policy dependent upon technology; otherwise, the system 400 proceeds to step 414 where the underwriter is typically required to document reasons for writing coverage that does not meet minimum underwriting criteria.

In step 416, the process 400 retrieves and displays underwriting guidelines associated with the SIC that were previously entered in step 404. The present invention maintains a database on database means 250 and database means 270, which contains underwriting instructions and guidelines, including minimum premiums, loss or hazard mitigation technology and hazard rating instructions, corresponding to each SIC that a user might enter into the system 400 in step 404.

The loss or hazard mitigation technology and hazard rating instructions contain factors that are considered when associating a risk to a particular SIC. Based on risk mitigation technology and hazard rating information, the user selects one or more ratings for the quotation in step 418. The selected risk mitigation technology and hazard rating(s) are then stored in 419 in the system 200 databases, means 250, 270 as part of the computer file associated with the particular quotation.

In step 420, the user chooses one or more of the coverage types which are applicable to the casualty insurance policy dependent upon the specific risk mitigation technology being considered in the quote. Thus, for example, if the policy being quoted includes coverage for premises/operations liability, the process 400 would display a range of predetermined risk modifiers for the selected coverage. A risk modifier 423 is the result of the classification of the various technologies that are applicable to the insurable interest under consideration. The loss control programs and technology that the insured institutes, essentially influences the magnitude of the risk modifier 433. The risk modifier 423 is retrieved in step 422 to indicate where the specific underwriting risk falls in relation to a base or average risk for a given classification. In the present invention, the base risk has two components, a first specific risk 251, historically associated with the insurable interest, and a second specific risk 252 that mollifies the first risk dependent on the technology utilized. The insured's loss control programs, technology that the insured may have instituted, and the utilization of the technology influences the weight of the risk modifier. In steps 424 and 426, the user selects one of the predetermined risk modifiers for the selected coverage, and then documents the reasons (e.g., loss mitigation technology or loss control programs) for the specific risk modifier that the user selected. In step 428, the process may be repeated for each type of coverage dependent upon number or different technologies to be included as part of the quotation.

In step 430, the system 400 generates insurance premium amounts corresponding to a plurality of different insurance attachment points. For each attachment point, the corresponding premium amount generated by the system 400 is based on, among other things, a minimum premium amount associated with the SIC input in step 404, the hazard rating code(s) selected in step 418, and the two risk modifier code(s) selected in step 422. In a preferred embodiment, the premium amounts 253 are generated in step 430, from a table stored on the system 200 database means 250 or 270.

Next, in step 432, the user selects one or more of the attachment points generated in step 430 for quotation, and the system 400 then generates a quotation describing the policy being quoted and stating a premium for the policy. The quotation is then communicated to the insured.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

We claim:

1. A computerized method of insuring a property comprising:
    identifying a plurality of Standard Industrial Codes (SICs), wherein each SIC represents a manner of use for a potentially insurable property;
    storing the plurality of SICs in a computer;
    associating each SIC with a SIC-specific underwriting guideline in the computer;
    receiving, by the computer, a request to insure the property by entering into the computer data representing the property;
    receiving, by the computer, an indication of an intended use of the property by selecting with the computer a SIC from the plurality of stored SICs;
    collecting sensor data related to the property and storing the collected sensor data in the computer; and
    calculating, by the computer, a premium for an insurance policy for the property based at least in part on the collected sensor data, wherein an effect of the collected sensor data on the calculating of the premium is determined based on the selected SIC.

2. The computerized method of claim 1, comprising underwriting, using the computer, the property by applying the SIC-specific underwriting guideline associated with the selected SIC to the property and the stored sensor data to determine if the property is insurable or not insurable.

3. The computerized method of claim 2, wherein the calculating of the premium is performed in response to a determination based on the underwriting that the property is insurable.

4. The computerized method of claim 2, comprising, in response to a determination based on the underwriting that the property is uninsurable, displaying, by the computer, a denial of insurance coverage for the property.

5. The computerized method of claim 2, wherein the property is determined to be uninsurable based at least in part on the collected sensor data.

6. The computerized method of claim 2, wherein the property is determined to be insurable based at least in part on the collected sensor data.

7. The computerized method of claim 1, wherein the selected SIC indicates an industry in which the property is used.

8. The computerized method of claim 1, wherein the collected sensor data comprises data indicating the condition of the property.

9. The computerized method of claim 1, wherein the collected sensor data comprises data indicating usage of technology incorporated into the property.

10. The computerized method of claim 1, wherein the property comprises goods.

11. The computerized method of claim 1, wherein the property comprises a building.

12. The computerized method of claim 1, wherein calculating the premium includes combining a first premium component derived from the collected sensor data with a second premium component determined based on data generic to the insured property.

13. A computerized method of insuring a property comprising:
    identifying a plurality of Standard Industrial Codes (SICs), wherein each SIC represents a manner of use for a potentially insurable property;

storing the plurality of SICs in a computer;
associating each SIC with a SIC-specific underwriting guideline in the computer;
receiving, by the computer, a request to insure the property by entering into the computer data representing the property;
receiving, by the computer, an indication of an intended use of the property by selecting with the computer a SIC from the plurality of stored SICs;
collecting sensor data related to the property and storing the collected sensor data in the computer;
underwriting, using the computer, the property by applying the SIC-specific underwriting guideline associated with the selected SIC to the property and the stored sensor data to determine if the property is insurable or not insurable; and
calculating, by the computer, a premium for an insurance policy for the property based at least in part on the collected sensor data, wherein an effect of the collected sensor data on the calculating of the premium is determined based on the selected SIC.

14. The computerized method of claim 13, wherein the selected SIC indicates an industry in which the property is used.

15. The computerized method of claim 13, wherein the collected sensor data comprises data indicating the condition of the property.

16. The computerized method of claim 13, wherein the collected sensor data comprises data indicating usage of technology incorporated into the property.

17. The computerized method of claim 13, wherein the property comprises goods.

18. The computerized method of claim 13, wherein the property comprises a building.

19. The computerized method of claim 13, wherein the property is determined to be uninsurable based at least in part on the collected sensor data.

20. The computerized method of claim 13, wherein the property is determined to be insurable based at least in part on the collected sensor data.

21. The computerized method of claim 13, wherein calculating the premium includes combining a first premium component derived from the collected sensor data with a second premium component determined based on data generic to the insured property.

* * * * *

UNITED STATES PATENT AND TRADEMARK OFFICE
CERTIFICATE OF CORRECTION

PATENT NO. : 7,610,210 B2 Page 1 of 1
APPLICATION NO. : 10/655804
DATED : October 27, 2009
INVENTOR(S) : Helitzer et al.

It is certified that error appears in the above-identified patent and that said Letters Patent is hereby corrected as shown below:

On the Title page, item (75); please correct the spelling of inventor Jonathan Helitzer's name from Jonathon Helitzer to --Jonathan Helitzer--.

Signed and Sealed this

Eighth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,610,210 B2 Page 1 of 1
APPLICATION NO. : 10/655804
DATED : October 27, 2009
INVENTOR(S) : Helitzer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1672 days.

Signed and Sealed this

Twelfth Day of October, 2010

David J. Kappos
*Director of the United States Patent and Trademark Office*